US011089005B2

(12) United States Patent
Ford et al.

(10) Patent No.: US 11,089,005 B2
(45) Date of Patent: Aug. 10, 2021

(54) SYSTEMS AND METHODS FOR SIMULATED SINGLE SIGN-ON

(71) Applicant: Bank of America Corporation, Charlotte, NC (US)

(72) Inventors: Stuart D. Ford, Slapton (GB); Sanjay Bhanu, Camberley (GB); Martin Sunder Singh Devasirvatham Samuel, Southampton (GB)

(73) Assignee: Bank of America Corporation, Charlotte, NC (US)

( * ) Notice: Subject to any disclaimer, the term of this patent is extended or adjusted under 35 U.S.C. 154(b) by 259 days.

(21) Appl. No.: 16/504,791

(22) Filed: Jul. 8, 2019

(65) Prior Publication Data

US 2021/0014214 A1 Jan. 14, 2021

(51) Int. Cl.
*H04L 29/06* (2006.01)
*H04L 29/08* (2006.01)

(52) U.S. Cl.
CPC ...... *H04L 63/0815* (2013.01); *H04L 63/0428* (2013.01); *H04L 63/083* (2013.01); *H04L 63/104* (2013.01); *H04L 67/306* (2013.01)

(58) Field of Classification Search
CPC . H04L 63/0815; H04L 63/083; H04L 63/104; H04L 63/0428; H04L 67/306; G06F 21/31
See application file for complete search history.

(56) References Cited

U.S. PATENT DOCUMENTS

| 7,246,230 | B2 | 7/2007 | Stanko |
| 7,254,831 | B2 | 8/2007 | Saunders et al. |
| 7,260,838 | B2 | 8/2007 | Bones et al. |
| 7,496,953 | B2 | 2/2009 | Andreev et al. |
| 7,900,252 | B2 | 3/2011 | Kawano et al. |
| 8,140,854 | B2 | 3/2012 | Ogawa |

(Continued)

OTHER PUBLICATIONS

Hossain et al., "OAuth-SSO: A Framework to Secure the OAuth-Based SSO Service for Packaged Web Applications," 2018 17th IEEE International Conference On Trust, Security And Privacy In Computing And Communications. Published 2018. (Year: 2018).*

(Continued)

*Primary Examiner* — Chau Le
(74) *Attorney, Agent, or Firm* — Michael A. Springs

(57) ABSTRACT

A system provides access to a third-party application by a user without revealing at least one sign-on credential used to access the application to the user. The system includes an access management server and a permission server. The access management server hosts a user portal. In response to a user input from the user portal requesting to access the application, the access management server requests, from the permission server, confirmation of user's permission to access the application. The permission server determines whether access is confirmed using stored permission data, which includes applications the user is currently permitted to access. If the permission server confirms the user's permission, the access management server redirects the user to a sign-on page of the application, automatically enter the sign-on credentials in an anonymized format that is not readable by the user, and automatically submits the sign-on credentials.

20 Claims, 10 Drawing Sheets

(56) References Cited

U.S. PATENT DOCUMENTS

| | | |
|---|---|---|
| 8,418,238 B2 | 4/2013 | Platt et al. |
| 8,429,711 B2 | 4/2013 | Kramer |
| 8,453,224 B2 | 5/2013 | Mutt |
| 8,458,487 B1 | 6/2013 | Palgon et al. |
| 8,566,472 B2 | 10/2013 | Piccionelli |
| 8,707,409 B2 | 4/2014 | Shah et al. |
| 8,769,650 B2 | 7/2014 | Gargaro et al. |
| 8,793,779 B2 | 7/2014 | Ferchichi et al. |
| 8,812,862 B2 | 8/2014 | Ogawa |
| 8,826,143 B2 * | 9/2014 | Goodman ............... H04L 63/08 715/741 |
| 8,856,917 B2 | 10/2014 | Das et al. |
| 9,003,189 B2 * | 4/2015 | Yin ........................ H04L 63/06 713/168 |
| 9,111,105 B2 | 8/2015 | Barton et al. |
| 9,258,344 B2 * | 2/2016 | Sharaga ............... H04L 65/607 |
| 9,367,673 B2 | 6/2016 | Fadida et al. |
| 9,407,628 B2 | 8/2016 | Sondhi et al. |
| 9,516,016 B2 | 12/2016 | Colgrove et al. |
| 9,548,991 B1 | 1/2017 | Holden |
| 9,565,020 B1 | 2/2017 | Camenisch et al. |
| 9,607,171 B2 | 3/2017 | Dhoolia et al. |
| 9,608,986 B2 | 3/2017 | Ogawa |
| 9,722,990 B2 | 8/2017 | Uchil et al. |
| 10,033,766 B2 | 7/2018 | Gupta et al. |
| 2004/0193925 A1 | 9/2004 | Safriel |
| 2006/0218629 A1 | 9/2006 | Pearson et al. |
| 2007/0208936 A1 | 9/2007 | Ramos Robles |
| 2008/0034412 A1 | 2/2008 | Wahl |
| 2008/0235779 A1 | 9/2008 | Bogner |
| 2009/0125972 A1 | 5/2009 | Hinton et al. |
| 2010/0024015 A1 | 1/2010 | Hardt |
| 2010/0122333 A1 | 5/2010 | Noe |
| 2010/0154046 A1 * | 6/2010 | Liu ..................... H04L 63/0807 726/8 |
| 2011/0173689 A1 | 7/2011 | Kim et al. |
| 2011/0276537 A1 | 11/2011 | Jegerlehner et al. |
| 2012/0159612 A1 | 6/2012 | Reisgies |
| 2014/0337053 A1 * | 11/2014 | Smith ................. G06Q 30/0207 705/3 |
| 2015/0067809 A1 | 3/2015 | Madani et al. |
| 2015/0200932 A1 | 7/2015 | Wilkinson et al. |
| 2016/0021097 A1 * | 1/2016 | Shrotri ............... H04L 63/0815 726/8 |
| 2017/0329985 A1 | 11/2017 | Barboy et al. |
| 2019/0036913 A1 | 1/2019 | Tzur-David et al. |
| 2019/0036914 A1 | 1/2019 | Tzur-David et al. |
| 2020/0360119 A1 * | 11/2020 | Pitchaimani ......... A61C 9/0066 |

OTHER PUBLICATIONS

U.S. Appl. No. 16/504,907, filed Jul. 8, 2019, Ford et al.
U.S. Appl. No. 16/505,041, filed Jul. 8, 2019, Ford et al.

* cited by examiner

| Application Name | Network Address | Deployment ID |
|---|---|---|
| App A | www.app-a.com/signon1 | App A-1 |
| App A | www.app-a.com/signon2 | App A-2 |
| App B | www.app-b.com/signon | App B |
| App C | www.app-c.com/signon | App C |

*FIG. 2A*

SYSTEMS AND METHODS FOR SIMULATED SINGLE SIGN-ON

TECHNICAL FIELD

The present disclosure relates generally to managing user access to third-party applications. More particularly, in certain embodiments, the present disclosure is related to systems and methods for providing automatic sign on of a user to a secure third-party application without revealing to the user at least one security credential used to sign on to the application.

BACKGROUND

Conventional single sign-on approaches are not compatible with many third-party applications. For single sign-on to be used, an initial resource (e.g., a launch page for a web application) and any related third-party applications must share trust and be specially coordinated with compatible access management protocols such that, for example, sign-in authentication can be shared (e.g., in the form of an authorization token) between the initial resource to the applications. Many third-party applications are not coordinated in this way. For these third-party applications, each user must generally provide sign-on credentials to access the untrusted third-party applications. There exists a need for improved systems and methods for accessing third-party applications, which are not compatible with conventional single sign-on approaches.

SUMMARY

For a third-party application that is incompatible with conventional single sign-on approaches, access to the third-party application is generally managed by each associated user. For example, the user may create and/or store his/her own sign-on credentials (e.g., a username and password) for the application. When the user wishes to access a given application, he/she must navigate to the sign-on page of the application in a web browser and input the credentials to sign on to the application. This is inconvenient to the user, who is forced to not only remember and safekeep these security credentials but also to navigate to each of the third-party applications he/she wishes to access. Certain tools exist to aid the user in managing (e.g., storing and securing) his/her own security credentials.

There are, however, certain risks and drawbacks associated with conventional approaches to managing access to third-party applications, the recognition of which are encompassed by the present disclosure. For instance, conventional approaches to managing access to third-party applications are inefficient and insecure. For example, even if a user is diligent with respect to the security of his/her sign-on credentials, it is often preferred that these credentials are never revealed to the user. If the user is an employee, for instance, it may be preferred that the user not have access to sign-on credentials provided by their employer that allow access to employer-related third-party applications. When a user has access to these credentials, the applications can generally be accessed outside of the secure network environment that may be put in place at the user's place of work, and it may be undesirable to allow users to sign on to applications outside of this secure and controlled network environment. For example, the likelihood that sign-on credentials are compromised (e.g., by a bad actor seeking to obtain the credentials) or that the user misuses an application intended only for work-related purposes are increased when the application can be accessed outside of the controlled network environment provided by the employer where there may be safeguards and other tools for preventing malicious attacks and monitoring application access. Furthermore, if sign-on credentials are provided to the user by an entity (e.g., an employer) and the relationship between the user and the entity is terminated (e.g., if the user is no longer employed by the employer), the user will generally still be able to use the known credentials to access the third-party application against the wishes of the entity.

The systems and methods described in the present disclosure provide a technical solution to the technical problems of conventional approaches to managing access to third-party applications, particularly for those third-party applications that are not configured for single-sign on. The systems and methods described in the present disclosure provide several advantages and improvements to previous technology including: (1) approximating the user experience of single sign-on without requiring back-end coordination or trust between the main application and the third-party application; (2) facilitating more efficient and automatic access to approved third-party applications; and (3) more securely managing the security policies of third-party applications by preventing sign-on credentials from being revealed to the user.

In some embodiments, an access management server stores security policy data, which maps each user to permitted third-party applications, and the corresponding application-specific and user-specific sign on credentials. The security policy data may include, for a given user, a list of permitted third-party applications to which the user may request access, a network address for a sign-on page for each application, and credentials which may be used to sign a user on to the applications. The credentials are generally stored in an encrypted format for improved data security. The access management server may also receive updated permission data (e.g., from a trusted permission database) to update the security policy data with the most current permission data for users (e.g., the current third-party applications to which each user is currently permitted access based on any possible changes to user permissions). The updated permission data may also or alternatively be used to confirm or deny user requests to access a given application in real time, thereby accounting for up-to-the-minute changes to user permissions.

An administration portal hosted by the server facilitates efficient mapping of the third-party applications to sign-on credentials and the subsequent mapping of these credentials to particular users who are permitted to access the applications. As these mappings are created, the security policy data is updated to include entries that reflect the created associations. For instance, if input provided in the administration portal corresponds to an association of a user with a set of credentials corresponding to an application, the security policy data may be updated to include an entry that includes an identifier of the user, the set of credentials, and the corresponding application (e.g., via a network address of a sign-on page of the application). Thus, unlike conventional password vaults, the user is not required to be involved in any aspect of managing access to the third-party applications. Instead, the creation, storage, and mapping of credentials to particular users and applications is isolated from the users such that the user credentials are not revealed to the users. This provides a seamless user experience during sign on without requiring back-end coordination and trust between the third-party application and the initial resource of conventional single sign-on approaches.

In some embodiments, a user accesses a secure third-party application via a user portal hosted by the access management server. After the user signs on to the user portal, a query is submitted to the access management server to request a list of third-party applications to which the user may request access. Generally, the names of the applications and associated network addresses are displayed to the user in the user interface of the user portal. In response to a user selection of one of the third-party applications, the user is redirected from the user portal to the sign-on page of the application and a request is received by the access management server for the sign-on credentials for the user and the application. The access management server may send a confirmation request to a permission server that stores updated permission information for users to confirm that permission is currently granted for access to the application by the user. If permission is granted, the sign-on credentials are automatically entered in an anonymized format and submitted in the sign-on page, thereby facilitating automatic access to the third-party application by the user without revealing the sign-on credentials to the user.

In some embodiments, an application access tool, which may be in communication with a browser extension executed on the device of the user, is used to automatically enter and submit the sign-on credentials in the sign-on page of the third-party application. The application access tool automatically identifies form fields in the sign-on page of the third-party application, using a source code database that includes one or more tables of predefined object identifiers of html source code, an object in the sign-on page corresponding to each predefined object identifier, and an action associated with each predefined object identifier (e.g., entering the credential, submitting all entered credentials, etc.). Based on the identified form fields, the application access tool automatically populates the fields with the appropriate sign-on credentials for the user and application and submits the credentials without revealing them to the user. The application access tool generally inspects the html source code of the sign-on page to determine object identifiers that correspond to the form fields for entering the various sign-on credentials. The tool then enters the appropriate credentials in the fields in an anonymized format and automatically submits the credentials to sign on to the application. In some cases, additional user responses are required to sign on to a third-party application. For example, certain sign-on pages require an additional form of verification such as a multi-factor authentication (e.g., entry of a code sent to a mobile device of the user) or a response to a CAPTCHA to verify that the user is a human who is attempting to access the application. In these cases, the application access tool provides additional security by preventing the user from accessing the html source code of the sign-on page (e.g., by blocking the development tools of the user's browser) so that the user cannot inspect the code and potentially determine his/her credentials based on the source code.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIGS. 2A-D are diagrams of various pages of a user interface of an administration portal used to configure the access management server;

DETAILED DESCRIPTION

The systems and methods described in the present disclosure provide a technical solution to the technical problems discussed above by providing systems and methods to automatically sign users on to third-party applications (e.g., websites, e.g., web-hosted resources) that are not configured for single sign-on. Rather than providing credentials (e.g., a username and password) to users for access to the applications, the systems and methods segregate the users from the management of the credentials such that the appropriate credentials are appropriately mapped, based on permission data and administrator preference, to approved users and the corresponding applications. This facilitates efficient access to these third-party applications without compromising the security of the sign-on credentials.

Figure 1:
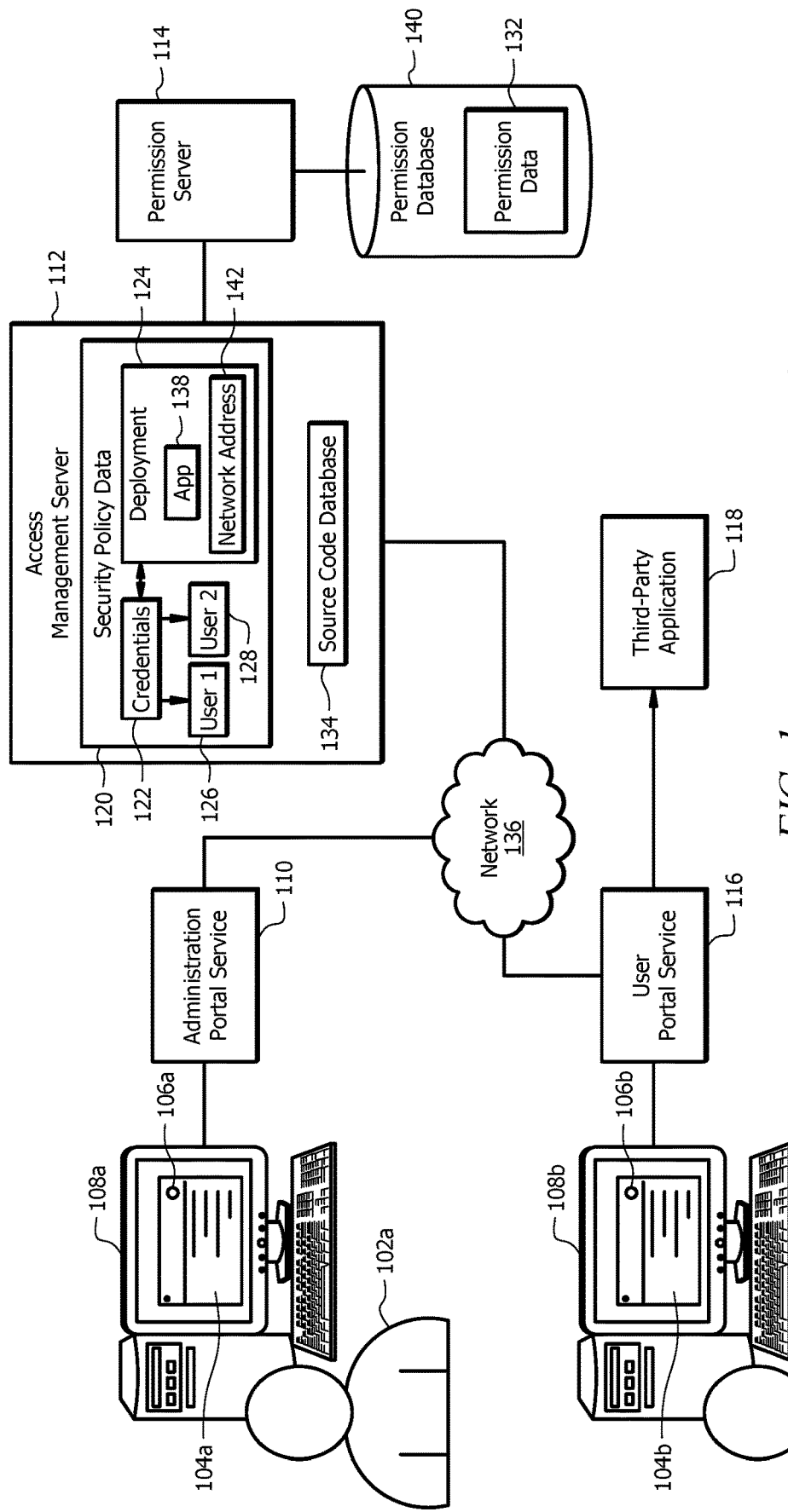
FIG. 1 is a schematic diagram of system for simulated single sign-on, according to an illustrative embodiment of the present disclosure.

FIG. 1 is a schematic diagram of a system 100, according to an illustrative embodiment of the present disclosure. The system 100 generally provides the ability for a user to access a secure third-party application without revealing at least one credential (e.g., a password) used to access the application to the user. The system 100 is configured for both securely managing security policy data 120 used to provide automatic access to third-party applications. In contrast to conventional systems, the system 100 is configured to perform functions that facilitate sign-on to secure third-party applications that are not compatible with conventional single sign-on, while maintaining the security of sign-on credentials by segregating the users from sign-on credential creation and management activities. Sign-on credentials are generally not revealed to users.

The system 100 comprises an access management server 112 which hosts an administration portal service 110 and a user portal service 116 on network 136, an administrator device 108a operated by administrator 102a, a user device 108b operated by user 102b, and a permission server 114. The system 100 redirects the user 102b from the user portal 104b to a third party application 118 (e.g., a third-party website). The system 100 may be configured as shown or in any other suitable configuration.

Figure 7:
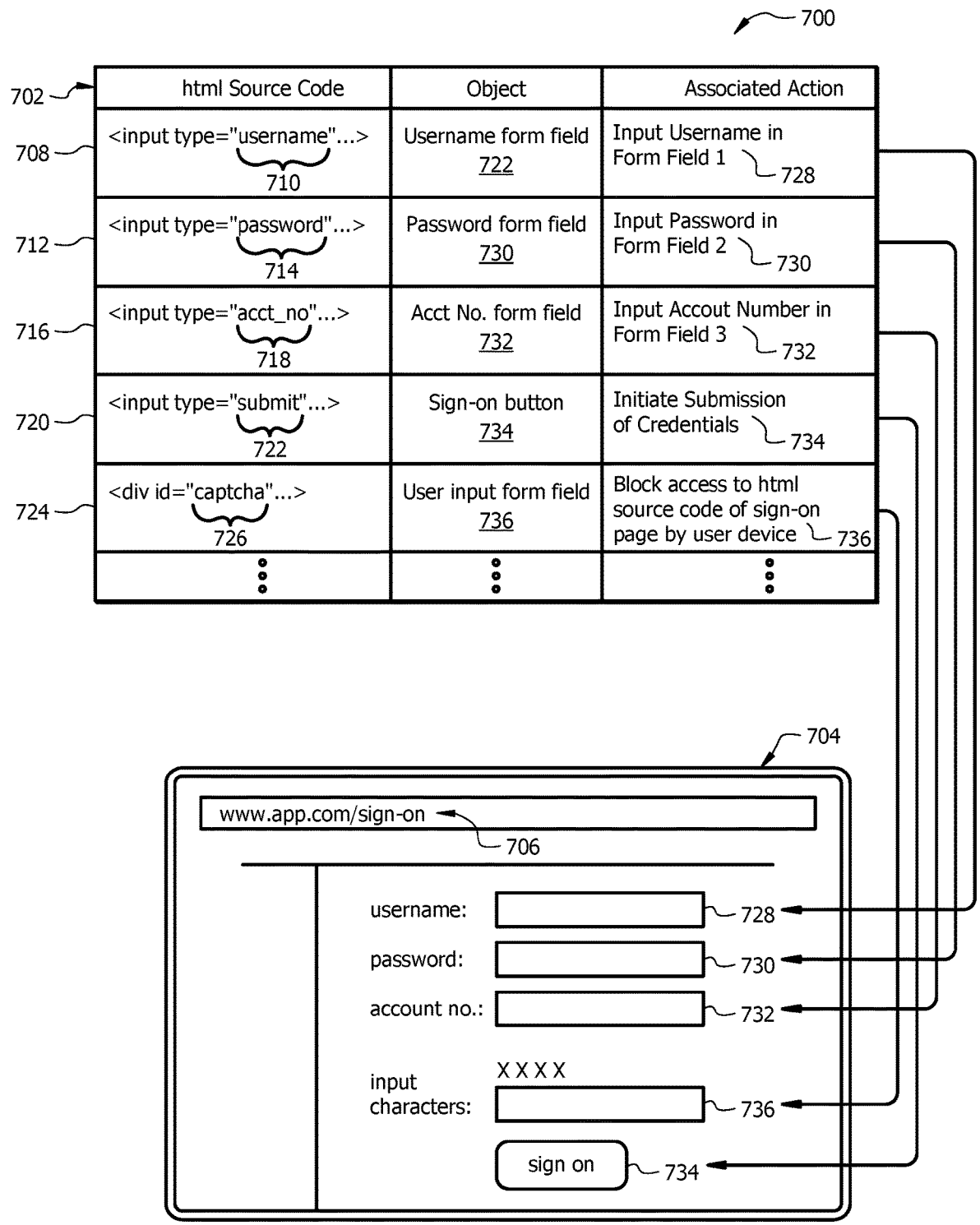
FIG. 7 is a diagram illustrating a table of a source code database used to automatically populate a sign-on page of a third-party application using an application access tool.

The access management server 112 generally stores security policy data 120 and a source code database 134, which are used by the user portal service 116 to provide access to the third-party application 118. The security policy data 120 is configured and managed by an administrator 102a via an administration portal 104a configured by the administration portal service 110 hosted by the access management server 112, as described in greater detail below. The security policy data includes credentials 122 that are mapped (e.g., based on user input provided at the administration portal 104a) to particular deployment 124, which corresponds to a third-party application 138 and a network address 142 for accessing the application 138, and one or more users (i.e., users 126 and 128). As described in greater detail below, the security policy data 120 is generally generated based on permission data 132 stored in the permission database 140 of the permission server 114. The source code database 134 includes one or more tables of predefined object identifiers of html source code, an object in the sign-on page corresponding to each predefined object identifier, and an action associated with each predefined object identifier (e.g., entering the credential, submitting all entered credentials, etc.). An example table of the source code database 134 is shown in FIG. 7 and described below.

The permission server 114 generally receives, stores, and transmits updated permission data 132. The updated permission data 132 may be stored in permission database 140 and typically includes a list of the most up-to-date or current information for which third-party applications 118 each user 102b is permitted to access. This disclosure contemplates permission database 140 storing information arranged in any format. For example, permission database 140 may store files, directories, and/or queues. Information stored in the permission database 140 is generally maintained by a trusted entity that is responsible for establishing and maintaining access permissions for each user. For example, the information in the permission database 140 may be updated after a given user 102b is no longer associated with the entity to remove the user's permissions to access any of the third-party applications.

The access management server 112 may request the updated permission data 132 (e.g., at predetermined times, at predetermined time intervals and/or during performance of particular tasks such as when the server 112 is determining whether the user 102b may be granted access to the third-party application 118) in order to update the security policy data 120 stored in the access management server 112. In some embodiments, the access management server 112 may transmit a request to authorize access to specific third-party application 118, and, in response to this request, the permission server 114 returns a confirmation or denial of the user's permission to access the application (e.g., rather than transmitting the entirety of the information stored in the permission database 140). This can allow the access management server 112 to confirm or deny user permissions more efficiently without repeated copying and transmission of the updated permission data 132 stored in permission database 140.

The administration portal service 110 is hosted by the access management server 112 on the network 136 and generally facilitates display of the user interface of the administration portal 104a on the device 108a of the administrator 102a. The administration portal service 110 may include a virtual server that is communicatively coupled to the access management server 112 and the device 108a. In some embodiments, the administration portal service 110 is executed within the access management server 112 itself.

The administrator 102a may be an individual who is authorized to control and modify which users may access third-party applications. While the administrator 102a can provide this initial authorization, the system 100 is configured such that the administrator 102a cannot circumvent the rules set in place by the permission data 132 by, for example, associating a user 102b to an application 138 that is not permitted based on the permission data 132.

The user portal service 116 is hosted by the access management server 112 on the network 136 and generally facilitates display of a user interface of the user portal 104b on the device 108b of the user 102b. The user portal 104b generally facilitates selection, by the user 102b, of a third-party application 118 to access and automatically accesses the third-party application 118, if permission is granted by the permission server 114. The user portal service 116 may be a virtual server that is communicatively coupled to the access management server 112 and the device 108b (e.g., as shown, via network 136). In some embodiments, the administration portal service 110 is executed within the access management server 112. The user 102b may be an individual who wishes to access the third-party application 118. An application access tool 106b, in communication with a browser extension executed on the user's device 108b, facilitates automatic sign-on to the third-party application 118.

Configuring Security Policy Data Via Administrative Portal

In an example operation of the system 100, administrator 102a signs on to the administration portal 104a via a sign-on page in the user's browser to configure security policy data 120 in the access management server 112. Generally, the administrator 104a accesses the administration portal 104a and navigates through various pages of the portal 104a to manage (i.e., add, change, remove) security policy data 120 used by the access management server 112. FIGS. 2A-D illustrate various pages which may be viewed by administrator 102a to configure the security policy in the access management server 112.

FIG. 2A shows a first page 200 of the administration portal 104a which displays a table of available deployments to be configured. Each deployment corresponds to a unique combination of a third-party application and a network addresses corresponding to a sign-on page of the application. Deployments generally account for the possibility that a given application may have more than one sign-on page (e.g., based on account type or services being accessed in the application). After signing on to the administration portal 104a, the administrator 102a may navigate (e.g., using a menu displayed in the portal 104a) to the first page 200. On page 200, the administrator can view the various third-party applications that are available and the corresponding sign-on network addresses for each application. As described above, a given third-party application can be associated with a plurality of deployments. For example, App A shown in rows 202 and 204 of FIG. 2A has two possible sign on addresses, corresponding to deployments with identifiers "App A-1" and "App A-2." Row 202 shows the application A has a corresponding first network address and is named deployment "App A-1," while row 204 shows the application A has a corresponding second network address and is named deployment "App A-2." Row 206 shows that application B has a corresponding network address and is named deployment "App B." Row 208 shows that application C has a corresponding network address and is named deployment "App C." The information displayed on page 200 of the administration portal 104b is generally based on the permission data 132 stored in the permission server 114. for example, this information may be updated (e.g., automatically at predetermined times, at predetermined time intervals, and/or in response to a user request for an update) by accessing the updated permission data 132 stored in the permission database 140 of permission server 114.

Figure 2B:
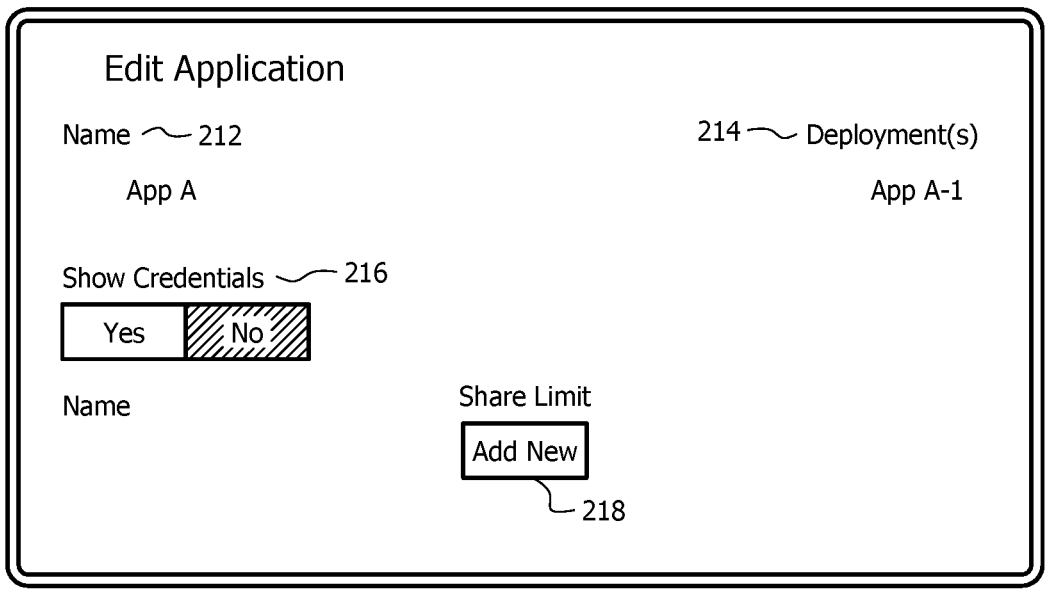

FIG. 2B shows a second page 210 of the administration portal 104a which facilitates input by the administrator 102a of sign-on credentials for the example deployment 214 "App A-1" shown in FIG. 2A. Deployment 214 corresponds to an Application Name 212 of "App A." To view the network address for the sign-on page for deployment 214, the administrator 102a may navigate back to page 200 shown in FIG. 2A. The second page 210 includes a selector 216 for hiding or showing credentials for this deployment. In some cases, the administrator 102a may wish to keep certain unused credential information hidden (e.g., to prevent a passerby from viewing the credentials). The second page 210 also includes a link 218 for adding new credentials.

Figure 2C:
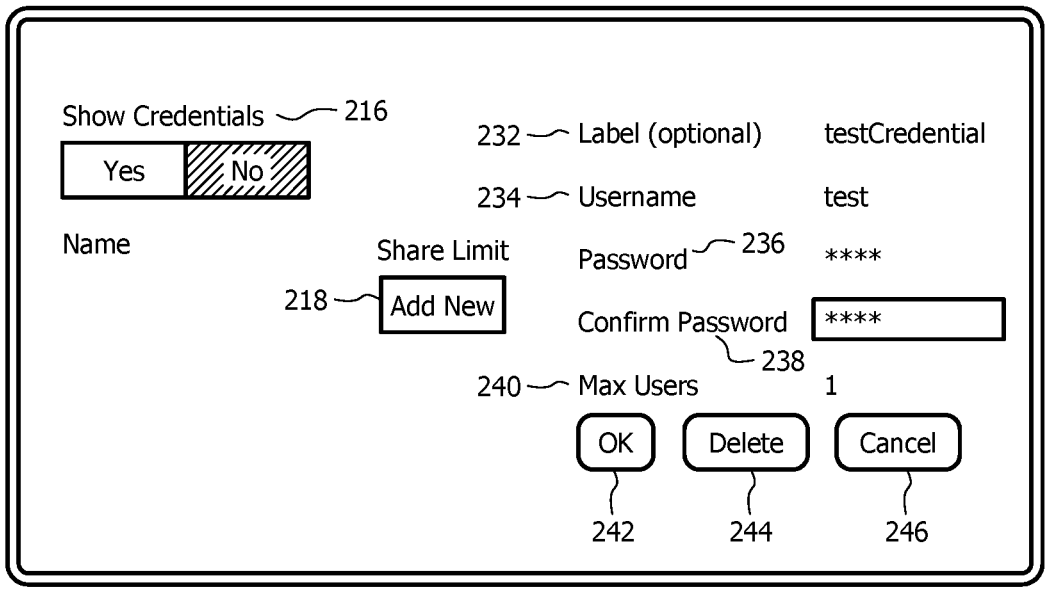

As shown in FIG. 2C, upon selection of link 218 by the administrator 102a, form fields 232, 234, 238, and 240 are displayed on the right side of the second page 210. Field 232 is for entering an optional name for the credentials. Field 234 is for entering a username credential. Form fields 236 and 238 are for entering and confirming a password credential. As shown in FIG. 2C, the password may be displayed in an anonymized format to further safeguard the password credential. Field 240 allows the administrator to enter a numeric value corresponding to the maximum number of users that may use these credentials. This accounts for certain applications allowing multiple users to access the applications using the same credentials, while other applications require each user to have his/her own unique credentials. Following input of information in page 210, credentials are saved and mapped or associated with the "App A-1" deployment (i.e., the combination of the application name App A and its particular sign-on network address for the deployment).

Figure 2D:
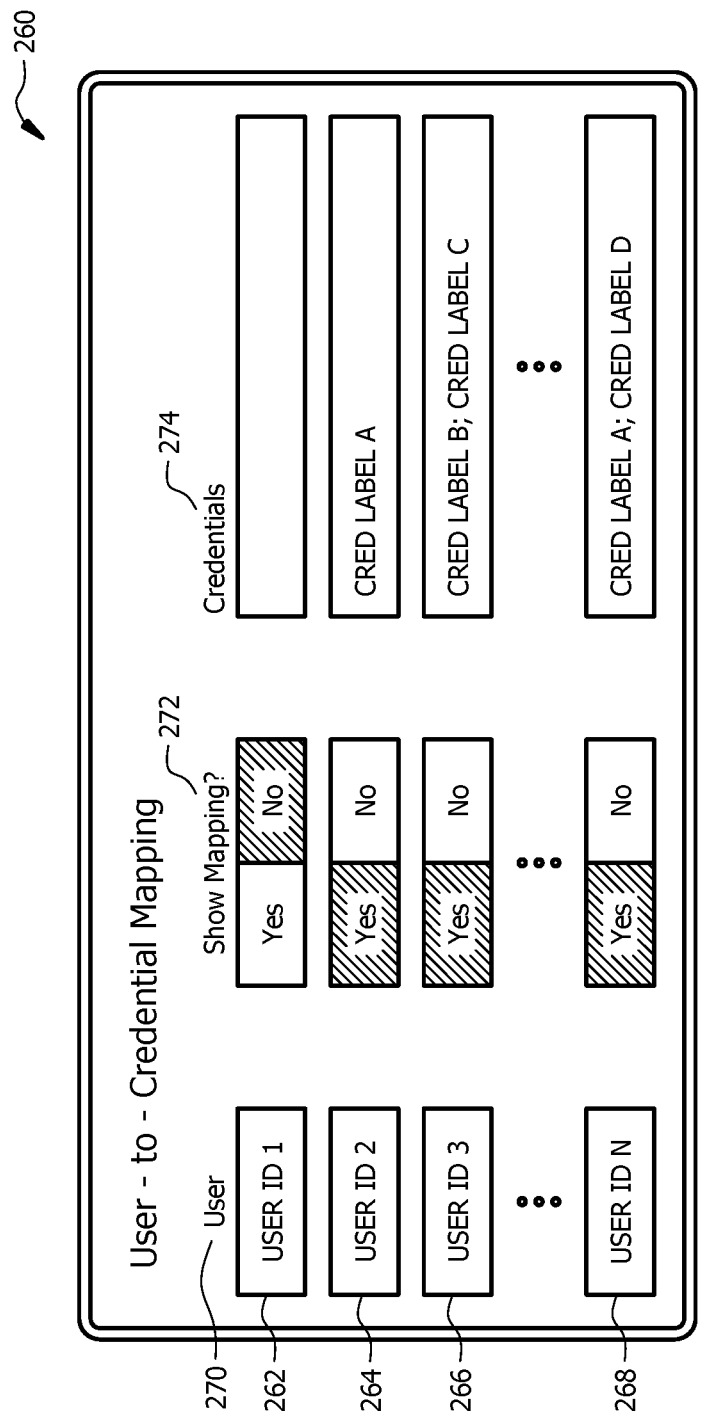

FIG. 2D shows a third page 260 of the administration portal 104a in which the administrator 102a associates (e.g., "maps") the credentials created in the second page 210 to one or more users (e.g., users 126 and 128 of FIG. 1). Each row of information on page 260 includes a user identifier 270, a selection tool 272 to hide or display the credential name(s) for the available credentials, and a field 274 for displaying the credential name(s) for the user. Row 262 shows information for a first user with the identifier "USER ID1." For this user, the administrator 102a has chosen to hide the mapping to the user's credentials. This can provide improved security by preventing a passerby from viewing confidential credential information that is not being actively modified by the administrator 102a for USERID1.

Still referring to FIG. 2D, row 264 shows information for a second user with a user identifier "USER ID2." As shown in the figure, this user is mapped to a set of credentials with the label "CRED LABEL A." Row 266 shows information for a third user with "USER ID3." As shown in the figure, this user is mapped to two sets of credentials with the labels "CRED LABEL B" and "CRED LABEL C." Row 266 shows information for an $n^{th}$ user with "USER IDn." As shown in the figure, this user is mapped to two sets of credentials with the labels "CRED LABEL A" and "CRED LABEL D." In this illustrative example the second user and the nth user are both mapped to the same credentials corresponding to "CRED LABEL A." Thus, the same credentials can be efficiently reused and associated with two or more users.

After the administrator 102a selects credentials to associate with a user, the access management server 112 may use the permission data 132 to confirm that this credential-to-user mapping is permitted. For example, the server 112 may determine, based on the permission data 132, whether the user is permitted access to the application that the administrator 102a associated with the credentials (i.e., on page 210 of the administration portal 104a). For instance, the server may access a list of third-party applications to which the user is permitted access and determine whether a name or identifier of the application is included in the list. If the server 112 determines that the user is permitted access to the application, the user will be associated with the third-party application and the security policy data 120 will be updated to reflect this association. For instance, an entry may be added to the security policy data that includes an identifier of the user 126 or 128, the credentials 122 that were mapped to the user, and the deployment 124 that was mapped to the credentials (i.e., the identifier of the application 138 and the sign-on network address 142 for the application).

Figure 3:
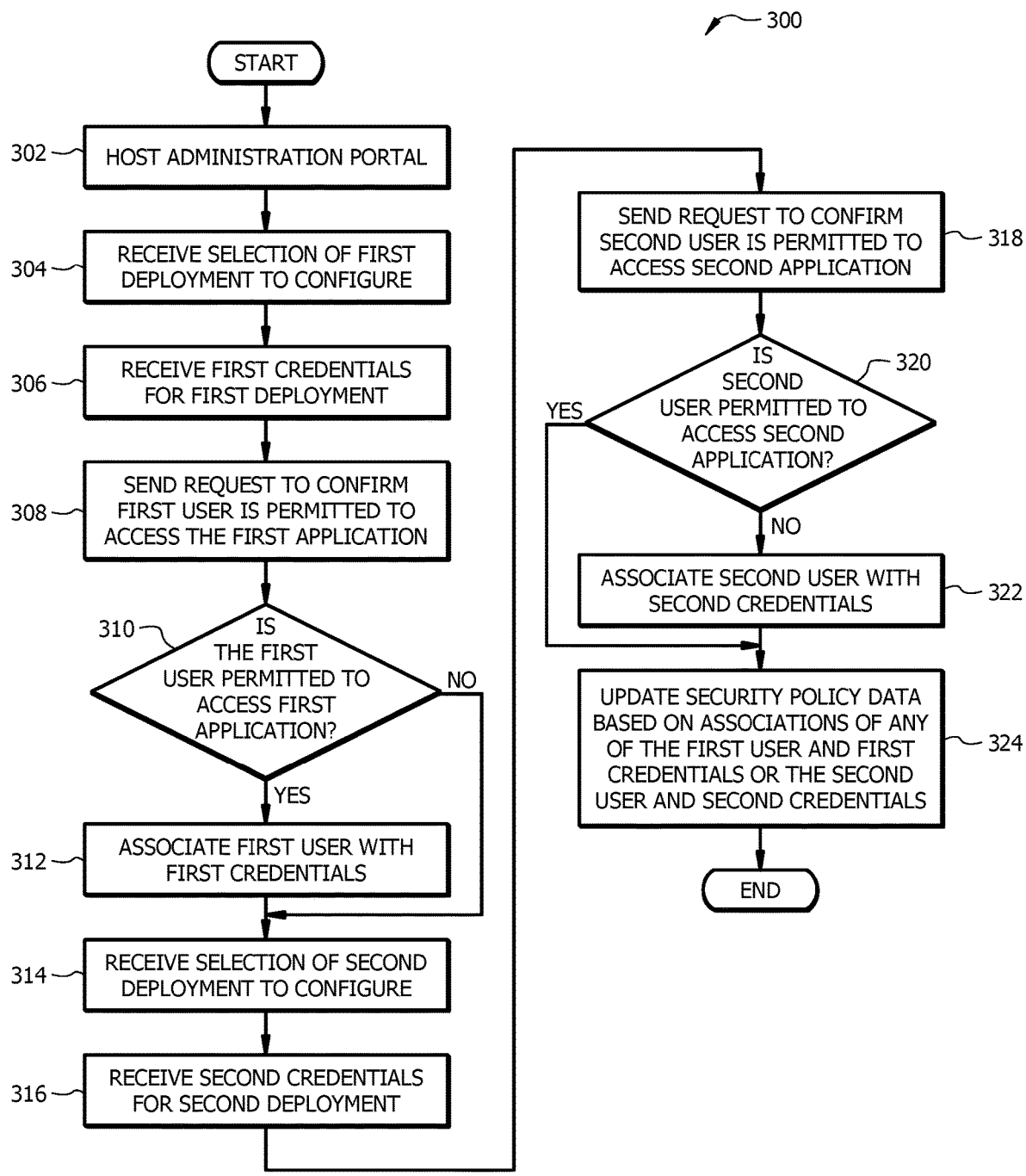
FIG. 3 is a flowchart of a method for providing access to a third-party application via a user portal.

FIG. 3 provides an example of a method 300 for configuring security policy data 120 using the administration portal 104a. At step 302, the access management server 112 hosts a session of the administration portal 104a on the network 136 for receiving user input from administrator 102a. Examples of the administration portal 104a are shown in FIGS. 2A-D and described above.

At step 304, the access management server 112 receives a selection of a first deployment to configure by the administrator 102a. The first deployment corresponds to a first third-party application and a network address for a sign-on page of the first third-party application. The selection is received in response to input provided by the administrator 102a in the user interface of the administration portal 104a. For example, the administrator 102a may select the first deployment to configure as shown above with respect to FIG. 2A by selecting the first deployment from a list of available deployments. The first deployment may be selected by a point-and-click action with a mouse or by tapping the deployment if the user interface of the administration portal 104a is displayed on a touch screen device.

At step 306, the access management server 112 receives sign-on credentials for the first deployment. The sign-on credentials provide access to the first third-party application via the sign-on page of the application. The sign-on credentials may be provided, for example, by the administrator 102a via an input provided by the administrator 102a at the user interface of the administration portal 104a. For example, the administrator 102a may type the credentials into the appropriate form fields described with respect to FIG. 2C above.

At step 308, in response to input provided at the user interface of the administration portal 104a that corresponds to an attempt to associate the sign-on credentials with a first user 126, a request is sent to the permission server 114 to confirm that the first user 126 is permitted access to the first third-party application. This provides a check that the administrator 102a is configuring the security policy data 120 according to user permissions reflected in permission data 132. The request may be generated automatically when the administrator 102a adds the sign-on credentials to a credential form field associated with the first user 126 (e.g., as shown in FIG. 2D). The request may include an identifier of the first user 126 and of the first application that was associated with the sign-on credentials in step 306. As described below, the permission server may use this information to determine whether the first user is permitted to access the first application based on the permission data 132.

At step 310, a response to the request sent in step 308 is received from the permission server 114 and used to determine if the first user 126 is permitted to access the first application. In other words, the response generally includes a confirmation or denial of permission to access the first third-party application by the first user 126. The permission server 114 generates the response using the permission data 132. The permission server 114 may, for example, access the permission data 132 and determine a permission status associated with the first user 126 and the first application. If the permission status corresponds to access being granted to the first user 126, the permission server 114 generates a response corresponding to a confirmation of permission to access the application, and the method 300 proceeds to step 312. However, if the permission status corresponds to access being denied to the first user 126, the permission server 114 generates a response indicating that permission is denied, and the method 300 proceeds to step 314.

At step 312, if the first response from the permission server 114 indicates that the first user 126 is permitted access to the first application, the first user 126 is associated with (e.g., mapped to) the sign-on credentials for the application. Otherwise, if permission is denied, the first user 126 is not associated with the sign-on credentials.

At step 314, the access management server 112 receives a selection of a second deployment to configure. The second deployment corresponds to a second third-party application and an associated network address for a second sign-on page of the second application. The selection is received in response to input provided by the administrator 102a in the user interface of the administration portal 104a in the same or a similar manner to that described above for selection of the first deployment (step 304).

At step 316, the access management server 112 receives sign-on credentials for the second deployment. The sign-on credentials provide access to the second third-party application via the sign-on page of the application. The sign-on credentials may be provided, for example, by the administrator 102a via an input provided by the administrator 102a at the user interface of the administration portal 104a in the same or a similar manner to that described above for the credentials of the first deployment (step 306).

At step 318, in response to input provided at the user interface of the administration portal 104a that corresponds to an attempt to associate the sign-on credentials of the second application with a second user 128, the access management server 112 sends a request to the permission server 114 to confirm that the second user 128 is permitted access to the second application. This provides a check that the administrator 102a is configuring the security policy data 120 according to user permissions reflected in permission data 132. The request may be generated automatically when the administrator 102a adds the sign-on credentials to a credential form field associated with the second user 128 (e.g., as shown in FIG. 2D). The request may include an identifier of the second user 128 and of the second application that was associated with the sign-on credentials in step 316. As described below, the permission server may use this information to determine whether the second user is permitted to access the second application based on the permission data 132.

At step 320, the access management server 112 receives, from the permission server 114, a response to the request sent in step 318. The is used to determine if the second user 128 is permitted to access the second application. The response generally confirms or denies permission to access the second application by the second user 128. The permission server generates this response using the permission data 132 as described above with respect to step 310. For example, the permission server 114 may access the permission data 132 and determine a permission status associated with the second user 128 and the second application. If the permission status corresponds to access being granted to the second user 128, the permission server 114 generates a response corresponding to a confirmation of permission to access the application, and the method 300 proceeds to step 322. However, if the permission status corresponds to access being denied to the second user 128, the permission server 114 generates a response indicating that permission is denied, and the method 300 proceeds to step 324.

At step 322, if the response received in step 320 indicates the second user 128 is permitted access to the second application, the second user 128 is associated with (e.g., mapped to) the sign-on credentials for the second application. Otherwise, if permission is denied, the second user 128 is not associated with the sign-on credentials.

At step 324, the access management server 112 automatically updates the security policy data 120, based on the association (if any at step 312) of the credentials of the first application with the first user 126 and the association (if any at step 322) of the credentials of the second application with the second user 128. If the credentials of the first application were associated with the first user 126 in step 312, the security policy data 120 stored in the access management server 112 is updated to include a first entry for the first deployment. The first entry may include an identifier of the first user, the sign-on credentials for the application of the deployment, and the network address of the sign-on page for the first application. If the credentials of the second application were associated with the second user 128 in step 322, the security policy data 120 stored in the access management server 112 is updated to include a second entry for the second deployment. The second entry includes an identifier of the second user 128, the sign-on credentials for the second application, and the network address for the sign-on page of the second application.

Automatic Sign-on Via User Portal

Figure 4:
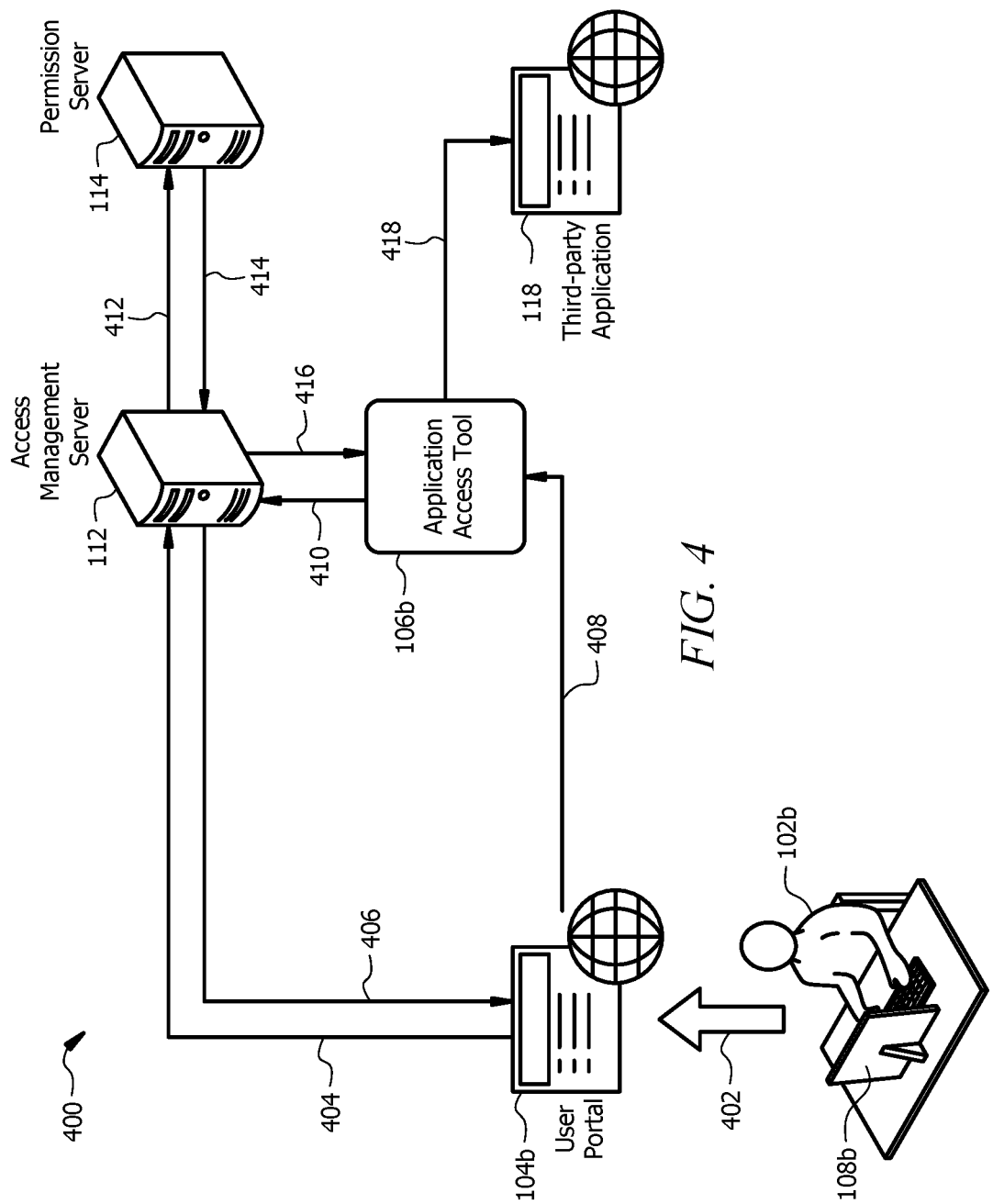
FIG. 4 is a flow diagram illustrating access of a third-party application using the systems and methods described in the present disclosure.

Returning to FIG. 1, in another example operation of the system 100, the user 102b signs on to the user portal 104b using his/her web browser to access the third-party application 118. Generally, the user 102b accesses the user portal 104b and submits a request to access the third-party application 118. FIG. 4 is a flow diagram depicting an example method 400 for accessing the third-party application 118 by the user 102b using the user portal 104b.

Referring to FIG. 4, at step 402, the user 102b signs on to the user portal 104b. For example, the user 102b may navigate his/her web browser to the appropriate fields of the sign-on page of the user portal, enter a username and password into the sign-on page, and submit the entered username and password. During this sign-on process, an authentication of the user's identity may be generated (e.g., in the form of an authentication token).

At step 404, a query is transmitted to the access management server 112. The query includes an identifier of the user 102b and a request for identification of applications to which the user 102b is permitted access. The query may also include the authentication of the user's identity generated during the sign on in step 402. In this way, the access management server 112 can further validate the authenticity of the user's identity. The query may be generated automatically upon sign on and/or initiated by the user 102b (e.g., via a selection in the user portal 104b). For example, following sign on of the user 102b, the user portal 104b may automatically generate a query for the user and transmit the query to the access management server 112 (e.g., via network 136).

Figure 5:
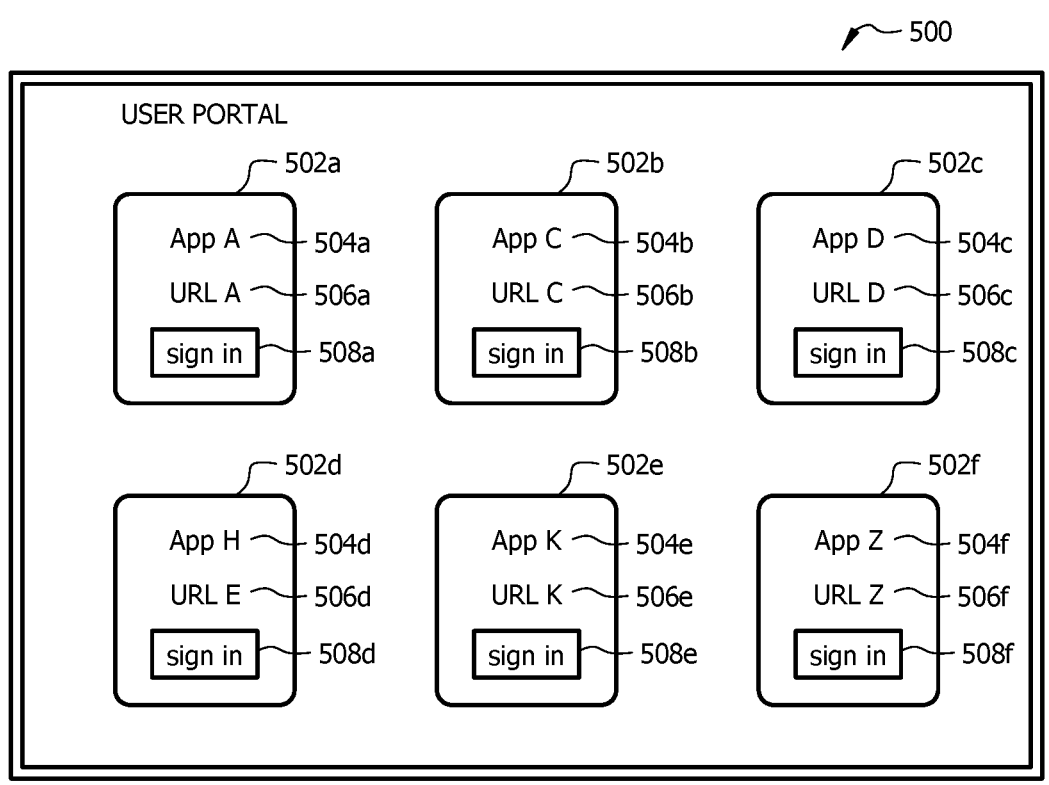
FIG. 5 is a diagram of a user portal accessed via a browser extension.

At step 406, a response to the query is transmitted from the access management server 112 for display in the user portal 104b. The response includes a list of third-party applications to which the user is permitted access. The information in the response is displayed on the user device 108b, as shown, for example in FIG. 5. In the example of FIG. 5, the page 500 of the user portal includes entries 502a-f. In general, each of entries 502a-f includes a corresponding name of the application 504a-f, a network address 506a-f of the application, and a user-selectable link 508a-f to access the network address. In some embodiments, an entry includes a deployment identifier. However, in other embodiments, the deployment identifiers are not revealed to the user 102b. Similarly, in some embodiments, network addresses and/or other application-related information are not displayed to the user 102b in the user portal 104b.

Referring again to FIG. 4, at step 408, the user 102b selects an application to access (e.g., the user 102b selects one of entries 402a-f shown in FIG. 4 to access the corresponding application). Upon selection of an application, the application access tool 106b is executed to request credentials for the user 102b and the application. The application access tool 106b is generally in communication with a browser extension of a web browser executed on the device 108b of the user 102b. The application access tool 106b may generate the request based on the user selection from step 408 and the user's identity before transmitting, in step 410, the request to the access management server 112.

At step 412, upon receiving the request for credentials, the access management server 112 may request a confirmation from permission server 114, based on information in the permission server 114, that the user 102b is currently permitted to use these credentials (i.e., to confirm that the user is still permitted access to the application based on the permission data 132, which may include changes not accounted for in the access management server 112). To accomplish this check, the access management server 112 transmits an authorization request to the permission server 114. The authorization request generally includes an identifier of the user 102b and of the application to which the user 102b is requesting access. The permission server 114 uses this information to determine, based on the permission data 132, whether the user 102b is currently permitted access to the requested application. For instance, the permission server 114 may identify a permission status for the particular user and application combination of the authorization request using the updated permission data 132.

At step 414, the permission server 114 transmits the result of this determination (i.e., a determination of access being authorized or denied to the user 102b) to the access management server 112. This allows the access management server 112 to only provide access to applications based on the most current permission information stored in the permission database 140. As described above, in some embodiments, the permission server 114 transmits the permission data 132 to the server 112 and the server uses this information to determine whether the user 102b is permitted access to the requested third-party application (e.g., using a similar or the same approach to that described above for steps 412 and 414).

At step 416, if the user 102b is determined to be authorized to access the application, the application access tool 106b receives the credentials for the user 102b and the requested application from the access management server 112 (i.e., based on the security policy data configured by the administrator 102a as described with respect to FIGS. 2A-D and 3 above). For example, the server may determine the appropriate credentials to transmit to the application access tool 106b by determining, based on the request generated in step 408 and transmitted in step 410, a user identifier corresponding to the user 102b and a sign-on network address for the requested application. The server 112 may then access an entry in the security policy data and identify the appropriate sign-on credentials that correspond to this combination of user identifier and network address. These sign-on credentials are then provided to the application access tool 106b.

At step 418, after the credentials are provided to the application access tool 106b, the tool 106b redirects the user to the sign-on page of the requested application from the user portal 104b and automatically signs the user 102b on to the application using the provided credentials. The application access tool 106b is generally executed as or in communication with a browser extension on the device 108b of the user 102b and automatically enters and submits credentials in the sign-on page of the requested application without revealing at least one of the credentials, typically a password, to the user 102b.

Automatic Input and Submission of Sign-on Credentials

Figure 6:
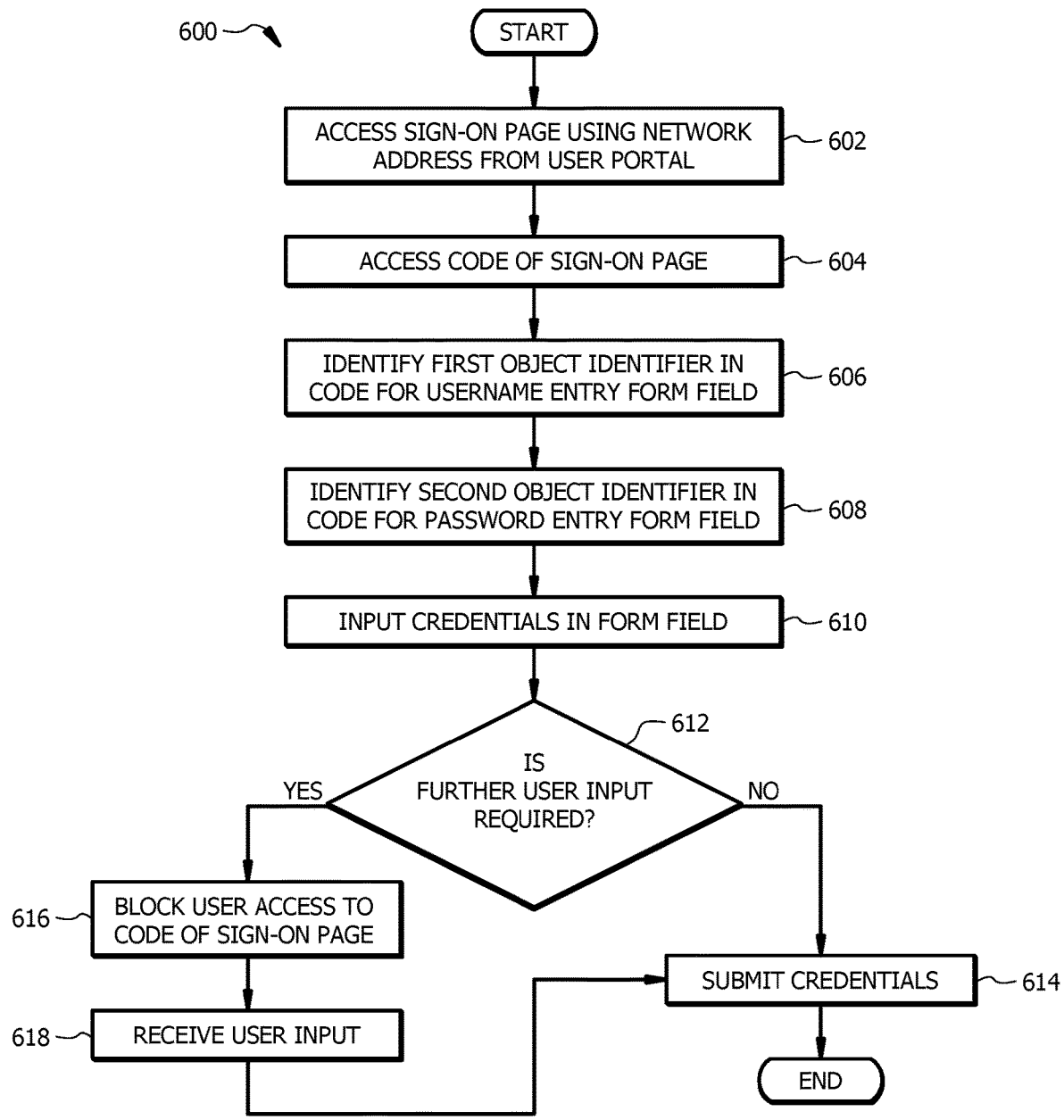
FIG. 6 is a flowchart of a method for automatically populating a login page with user credentials and automatically submitting the user credentials without revealing at least one credential to the user.

FIG. 6 shows an example of a method 600 used by the application access tool 106b to use the credentials provided by the access management server 112 to automatically sign the user on to the application without revealing the credentials to the user 102b. At step 602, the application access tool 106b accesses the sign-on page of the application using the sign-on page network address provided via the user selection in the user portal 104b (e.g., from step 408 of FIG. 4). For example, the application access tool 106b may receive the network address for the sing-on page and causes the user's web browser to be redirected from the user portal to the sign-on page. In some embodiments, the sign-on page is accessed within the user portal (e.g., as a sub-window within the user portal). In some embodiments, the sign-on page is accessed by the application access tool 106b without the sign-on page being displayed to the user.

At step 604, the application access tool 106b accesses html source code of the sign-on page such that the code is inspectable in a searchable text format to the application access tool 106b. For example, the application access tool 106b may execute a command to inspect the source code of the sign-on page using development tools embedded within the web browser. Generally, the application access tool 106b inspects the source code without displaying the code to the user 102b.

At step 606, the application access tool 106b determines a first object identifier in the code corresponding to a first form field for input of a first credential. For example, the application access tool 106b may inspect the html source code of a sign-on page and identify html tags or html objects corresponding to a form field for entering the first credential. For instance, if the first credential is a username for accessing the application, the first identifier may include a related alphanumeric string such as "USERNAME." In some embodiments, the application access tool 106b determines the object identifier by (1) determining a type of the first credential (e.g., a username type, a password type, an account number type, etc.), (2) accessing a table (e.g., in the source code database 134 of FIG. 1) storing predefined object identifiers for each credential type, (3) determining a predefined identifier for the particular credential type, and (4) searching the text of the code to locate the identifier and a corresponding form field in the page. In some embodiment, the application access tool 106b may further determine a code type or code language used for the sign-on page to facilitate determination of the predefined identifier in step (3) above. For example, an object identifier for a username credential may be different in a first code language than it is in a second code language. The application access tool 106b may account for these differences to determine appropriate object identifiers for automatically entering and submitting credentials using method 600.

At step 608, the application access tool 106b determines a second object identifier in the code corresponding to a second form field for input of a second credential. The second object identifier may be determined using the same or a similar method to that described above with respect to step 606. For example, for a second credential that is a password for accessing the application, the second identifier may include a related alphanumeric string such as "PASSWORD."

At step 610, the application access tool 106b inputs the first and second credentials into the corresponding form fields determined in steps 606 and 608. Generally, the application access tool 106b copies the alphanumeric entry of each credential into the corresponding form field. Certain credentials (e.g., a password) may have increased need for security and thus are presented in an anonymized format that is not readable to the user 102b. In some embodiments, all credentials are displayed in an anonymized format that is not readable by the user 102b.

At step 612, the application access tool 106b determines whether additional user input is required in order to access the application. For example, in some cases, the sign-on page may require a form of multi-factor identification, a response to a question, and/or feedback regarding an image designed to ensure the application is being accessed by a human (e.g., a response to a CAPTCHA). If no further input is required from the user, the application access tool 106b proceeds to step 614 and automatically submits the credentials to sign the user on to the application.

If further input is found to be required in step 612, the application access tool 106b proceeds to step 616 and blocks access by the user 102b to the html source code of the sign-on page. For example, the application access tool 106b may disable functions of the web browser (e.g., development tools) that can facilitate inspection of a page's html source code. This prevents the user 102b from potentially determining his/her credentials, which were input in step 610, based on text found within the source code. For example, a user 102b with appropriate technical training might potentially use information found in the page's source code to determine his/her username and password. The application access tool 106b prevents the user 102b from accessing or viewing the code, thereby blocking the user 102b from obtaining these credentials.

At step 618, the application access tool 106b receives the additional user input required for signing on to the application. For example, the application access tool 106b may display a field requesting the additional user input and, upon receiving the input, populate the appropriate form field in the sign-on page before proceeding immediately to step 614 and submitting the credentials to access the application. In some embodiments, the user 102b may provide the credentials directly in the appropriate form field of the sign-on page (i.e., without requiring action by the application access tool 106b in step 618) and submit the additional input along with the credentials that are automatically input by the application access tool 106b.

FIG. 7 shows a diagram 700 that further illustrates how a table 702 from the source code database 134 may be used to populate and submit sign-on credentials in the appropriate form fields of a sign-on page 704, which corresponds to network address 706. Table 702 includes portions of source code and corresponding objects in the sign-on page and associated actions to perform by the application access tool 106b. For example, portion 708 of html source code includes an object identifier 710 that corresponds to a username form field 728. The action associated with this object identifier and form field is to input the username credential in the username form field 728 of the sign on page 704. Similarly portions 712 and 716 of html source code include object identifiers 714 and 718, respectively, which are in turn associated with the input of a password credential in the password form field 730 and of an account number credential in the account number form field 732.

Portion 720 of html source code includes an object identifier 722 for a submit or sign-on button 734 in the sign-on page 704. This button 734 is associated with initiating the submission of input credentials after they are entered in the sign-on page 704. Portion 724 of html source code includes an object identifier 726 that is associated with a form field 736 that requires a manual or user-specific entry from the user (e.g., from user 102b of FIGS. 1 and 4). For example, form field 736 may be for entry of some additional information by the user such as a multi-factor authentication (e.g., entry of a code sent to a mobile device of the user) or a response to a CAPTCHA to verify that the user is a human who is attempting to access the application. Object identifier 726 is associated with the actions(s) of delaying the submission action of object identifier 734 until the user-specific entry is received and optionally blocking access to the html source code of the sign-on page by the user. As described above, blocking access to the html source code of the sign-on page provides further security for the credentials by preventing a user from determining his/her credentials during the delay provided to enter his/her manual response in form field 736.

Figure 8:
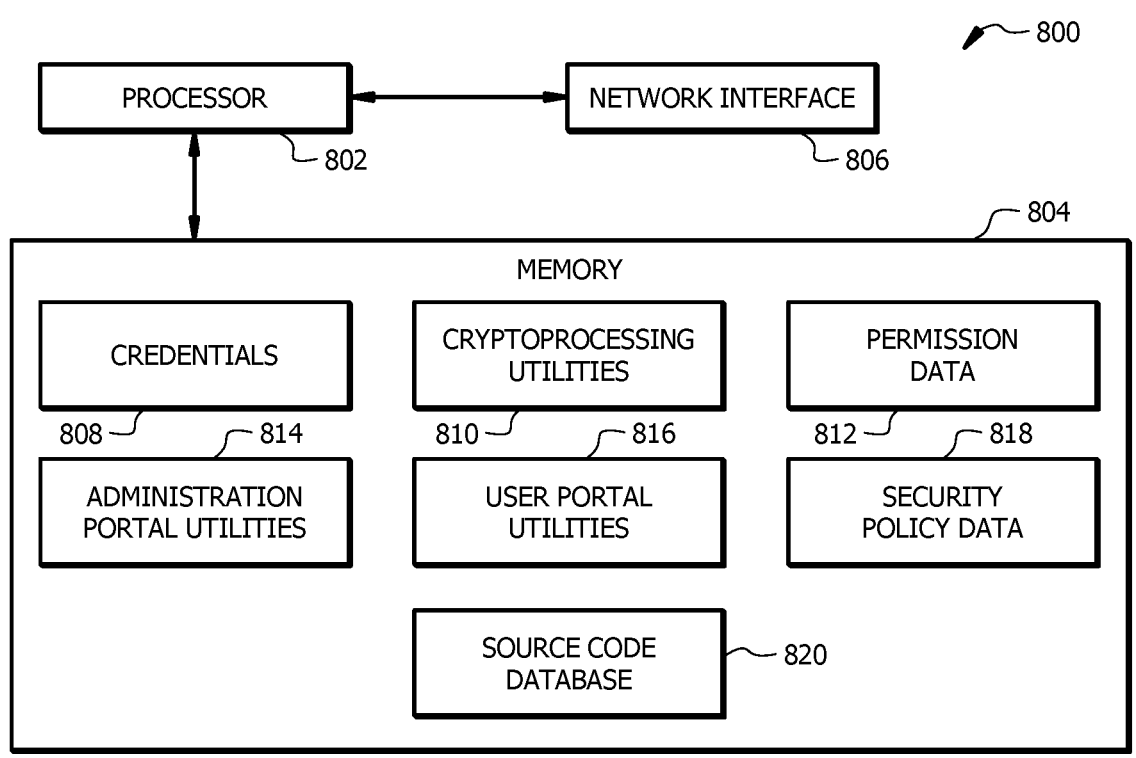
FIG. 8 is an embodiment of a device configured to implement methods described in the present disclosure.

FIG. 8 is an embodiment of a device 800 configured to implement system 100 and the methods described herein. For example, device 800 may be configured to perform any one or more of the processes and/or functions associated with the administrative portal service 110, the user portal service 116, the access management server 112, and the permission server 114 of FIG. 1. The device 800 comprises a processor 802, a memory 804, and a network interface 806. The device 800 may be configured as shown or in any other suitable configuration.

The processor 802 comprises one or more processors operably coupled to the memory 804. The processor 802 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 802 may be a programmable logic device, a microcontroller, a microprocessor, or any suitable combination of the preceding. The processor 802 is communicatively coupled to and in signal communication with the memory 804. The one or more processors are configured to process data and may be implemented in hardware or software. For example, the processor 802 may be 8-bit, 16-bit, 32-bit, 64-bit or of any other suitable architecture. The processor 802 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement the function disclosed herein, such as some or all of methods 300, 400, and/or 600. In an embodiment, the function described herein is implemented using logic units, FPGAs, ASICs, DSPs, or any other suitable hardware or electronic circuitry.

The memory 804 is operable to store credentials 808, cryptoprocessing utilities 810, user permission data 812, administration portal utilities 814, user portal utilities 816, and security policy data 818, and/or any other data or instructions. The cryptoprocessing utilities 810, administration portal utilities 814, and user portal utilities 816 may comprise any suitable set of instructions, logic, rules, or code operable to execute the function described herein. The memory 804 comprises one or more disks, tape drives, or solid-state drives, and may be used as an over-flow data storage device, to store programs when such programs are selected for execution, and to store instructions and data that are read during program execution. The memory 804 may be volatile or non-volatile and may comprise read-only memory (ROM), random-access memory (RAM), ternary content-addressable memory (TCAM), dynamic random-access memory (DRAM), and static random-access memory (SRAM).

The credentials 808 generally include parameters required to sign-on to third-party applications. Common credentials include usernames and passwords. Other examples of credentials 808 stored in the memory 804 may include an account number associated with a corresponding application, and any other alphanumeric strings which must be input in a form field to sign-on to an application. The credentials 808 are generally stored in an encrypted format for improved security. In some embodiments, certain credentials are stored in an encrypted format while other credentials are not encrypted (e.g., the password may be encrypted while the username may not be encrypted). The cryptoprocessing utilities 810 are used by the device 800 to encrypt and de-encrypt the credentials 808 and/or any other information stored in the memory 804. In some embodiments, the encryption formats employed by the cryptoprocessing utilities 810 can be configured by an administrator (e.g., by administrator 102a in administration portal 104a).

The permission data 812 is used to confirm or deny users access to a requested third-party application. The permission data 812 typically includes a list of third-party applications to which the user is permitted access. The permission data 812 may further include a network address for a sign-on page for each third-party application. The permission data 812 can be updated based on information in a trusted permission source (e.g., a data source maintained by a trusted entity responsible for managing access permissions for each user such as permission server 114 of FIG. 1) to ensure that access is granted based only the most current information provided by the trusted source.

The administration portal utilities 814 are used to configure the administration portal 104a and the administration portal services 110 of FIG. 1. The administration portal utilities 814 may include, for example, instructions, logic, rules, or code operable to provide display of the user interface of the administration portal 104a on an administrator's device 108a and communication between the administration portal services 110 and the device 800. The administration portal utilities 814 may include, for example, formatting parameters for display of the administration portal 104a and communication protocols for receiving user input from the administration portal 104a.

Similarly, the user portal utilities 816 are used to configure the user portal 104b and the user portal services 116 of FIG. 1. The user portal utilities 806 may include, for example, instructions, logic, rules, or code operable to provide display of the user interface of the user portal 104b on a user's device 108b and communication between the user portal services 116 and the device 800. The user portal utilities 816 may include, for example, formatting parameters for display of the user portal 104b and communication protocols for receiving user input from the user portal 104b.

The security policy data 818, which is the same as or similar to security policy data 120 of FIG. 1, generally associates each user (or an identifier of each user) to permitted third-party applications, and the corresponding application-specific and user-specific sign-on credentials. The security policy data 818 may include, for a given user, a list of third-party applications to which the user may request access, a network address for a sign-on page for each application, and credentials which may be used to access the applications. Accordingly, the security policy data 818 may include links to the credentials 808 and the permission data 812.

The source code database 820, which is the same as or similar to the source code database 134 of FIG. 1, includes one or more tables of predefined object identifiers of html source code, an object in the sign-on page corresponding to each predefined object identifier, and an action associated with each predefined object identifier (e.g., entering the credential, submitting all entered credentials, etc.). An example of the information included in source code database 820 is shown in FIG. 7 and described above.

The network interface 806 is configured to enable wired and/or wireless communications. The network interface 806 is configured to communicate data between the device 800 and other network devices, systems, or domain(s). For example, the network interface 806 may comprise a WIFI interface, a local area network (LAN) interface, a wide area network (WAN) interface, a modem, a switch, or a router. The processor 802 is configured to send and receive data using the network interface 806. The network interface 806 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system for providing access to a third-party application by a user without revealing at least one credential used to access the application to the user, the system comprising:
   an access management server configured to:
      host a session of a user portal for receiving user input;
      store security policy data for the user, wherein the security policy data comprises, for the user, a list of third-party applications to which the user may request access and corresponding sign-on credentials for the third-party applications;
      receive a query provided by the user in the user portal, the query comprising a first request for display of the list of third-party applications to which the user may request access;
      in response to the query, display, in the user portal, the list of third-party applications to which the user may request access, wherein the displayed list is based on the security policy data;
      receive, in response to a user selection of a first third-party application from the list displayed in the user portal, a second request for the sign-on credentials for accessing the first third-party application;
      in response to the second request for the sign-on credentials, transmit, to a permission server, a third request for confirmation of permission to currently access the first third-party application by the user; and
   the permission server configured to:
      store permission data for the user, the permission data comprising a list of third-party applications to which the user is currently permitted access;
      receive the third request from the access management server;
      determine a current permission status for accessing the first third-party application by the user, based on the updated permission data; and
      generate a response for the third request, the response comprising confirmation or denial of permission to access the first third-party application by the user based on the current permission status;
   wherein the access management server is further configured to:
      receive the response from the permission server; and
      if the response comprises a confirmation of permission to access the first third-party application by the user:
         transmit the sign-on credentials to the first third-party application;
         redirect the user from the user portal to a sign-on page of the first third-party application;
         automatically enter the sign-on credentials in the sign-on page, wherein the credentials are automatically entered in an anonymized format that is not readable by the user; and
         automatically submit the entered sign-on credentials in the sign-on page, thereby providing access to the first third-party application to the user.

2. The system of claim 1, wherein the query comprises a user identifier for the user; and wherein the displayed list of third-party applications to which the user may request access is determined by identifying one or more third-party applications associated with the user identifier in the security policy data.

3. The system of claim 1, wherein the third request for confirmation of permission to currently access the first third-party application by the user comprises a user identifier for the user and an application identifier for the first third-party application to which the user is requesting access; and
   wherein the permission server determines the current permission status for the user by:
      accessing the permission data;
      identifying a status in the permission data indicating that access is denied or granted to the user based on the user identifier and the application identifier; and
      if the status indicates access is granted, the current permission status is a confirmation that access is permitted for the user.

4. The system of claim 1, wherein the current permission status for the user comprises the most recently available permission information for the user.

5. The system of claim 1, wherein the access management server is further configured to provide access to the first third-party application via a browser extension executed on a device of the user.

6. The system of claim 1, wherein at least one of the credentials is a password for accessing the first third-party application.

7. The system of claim 1, wherein the access management server is further configured to:
   receive the permission data from the permission server; and
   update the security policy data, based on the received permission data, such that the updated security policy data comprises a list of third-party applications to which the user is currently permitted access and corresponding sign-on credentials for the third-party applications.

8. A method for providing access to a secure third-party application by a user without revealing at least one credential used to access the application to the user, the method comprising:
   hosting a session of a user portal for receiving user input;
   storing security policy data for the user, wherein the security policy data comprises, for the user, a list of third-party applications to which the user may request access and corresponding sign-on credentials for the third-party applications;
   receiving a query provided by the user in the user portal, the query comprising a first request for display of the list of third-party applications to which the user may request access;
   in response to the query, displaying, in the user portal, the list of third-party applications to which the user may request access, wherein the displayed list is based on the security policy data;
   receiving, in response to a user selection of a first third-party application from the list displayed in the user portal, a second request for the sign-on credentials for accessing the first third-party application;

in response to the second request for the sign-on credentials, transmitting, to a permission server, a third request for confirmation of permission to currently access the first third-party application by the user, wherein the permission server is configured to:
  store permission data for the user, the permission data comprising a list of third-party applications to which the user is currently permitted access;
  receive the third request from the access management server;
  determine a current permission status for accessing the first third-party application by the user, based on the updated permission data; and
  generate a response for the third request, the response comprising confirmation or denial of permission to access the first third-party application by the user based on the current permission status;
receiving the response from the permission server; and
if the response comprises a confirmation of permission to access the first third-party application by the user:
  transmitting the sign-on credentials to the first third-party application;
  redirecting the user from the user portal to a sign-on page of the first third-party application;
  automatically entering the sign-on credentials in the sign-on page, wherein the credentials are automatically entered in an anonymized format that is not readable by the user; and
  automatically submitting the entered sign-on credentials in the sign-on page, thereby providing access to the first third-party application to the user.

9. The method of claim 8, wherein the query comprises a user identifier for the user; and wherein the displayed list of third-party applications to which the user may request access is determined by identifying one or more third-party applications associated with the user identifier in the security policy data.

10. The method of claim 8, wherein the third request for confirmation of permission to currently access the first third-party application by the user comprises a user identifier for the user and an application identifier for the first third-party application to which the user is requesting access; and
  wherein the permission server determines the current permission status for the user by:
    accessing the permission data;
    identifying a status in the permission data indicating that access is denied or granted to the user based on the user identifier and the application identifier; and
    if the status indicates access is granted, the current permission status is a confirmation that access is permitted for the user.

11. The method of claim 8, wherein the current permission status for the user comprises the most recently available permission information for the user.

12. The method of claim 8, further comprising providing access to the first third-party application via a browser extension executed on a device of the user.

13. The method of claim 8, wherein at least one of the credentials is a password for accessing the first third-party application.

14. The method of claim 8, further comprising:
  receiving the permission data from the permission server; and
  updating the security policy data, based on the received permission data, such that the updated security policy data comprises a list of third-party applications to which the user is currently permitted access and corresponding sign-on credentials for the third-party applications.

15. A device for providing access to a secure third-party application by a user without revealing at least one credential used to access the application to the user, the device comprising:
  a memory configured to store security policy data for the user, wherein the security policy data comprises, for the user, a list of third-party applications to which the user may request access and corresponding sign-on credentials for the third-party applications; and
  a processor communicatively coupled to the memory and a network interface, the processor configured to:
    host, on a network, a session of a user portal for receiving user input;
    receive a query provided by the user in the user portal, the query comprising a first request for display of the list of third-party applications to which the user may request access;
    in response to the query, display, in the user portal, the list of third-party applications to which the user may request access, wherein the displayed list is based on the security policy data;
    receive, in response to a user selection of a first third-party application from the list displayed in the user portal, a second request for the sign-on credentials for accessing the first third-party application;
    in response to the second request for the sign-on credentials, transmit, to a permission server, a third request for confirmation of permission to currently access the first third-party application by the user, wherein the permission server is configured to:
      store permission data for the user, the permission data comprising a list of third-party applications to which the user is currently permitted access;
      receive the third request from the access management server;
      determine a current permission status for accessing the first third-party application by the user, based on the updated permission data; and
      generate a response for the third request, the response comprising confirmation or denial of permission to access the first third-party application by the user based on the current permission status;
    receive the response from the permission server; and
    if the response comprises a confirmation of permission to access the first third-party application by the user:
      transmit, via the network, the sign-on credentials to the first third-party application;
      redirect the user from the user portal to a sign-on page of the first third-party application;
      automatically enter the sign-on credentials in the sign-on page, wherein the credentials are automatically entered in an anonymized format that is not readable by the user; and
      automatically submit the entered sign-on credentials in the sign-on page, thereby providing access to the first third-party application to the user.

16. The device of claim 15, wherein the query comprises a user identifier for the user; and wherein the displayed list of third-party applications to which the user may request access is determined by identifying one or more third-party applications associated with the user identifier in the security policy data.

17. The device of claim 15, wherein the third request for confirmation of permission to currently access the first third-party application by the user comprises a user identifier for the user and an application identifier for the first third-party application to which the user is requesting access; and
   wherein the permission server determines the current permission status for the user by:
      accessing the permission data;
      identifying a status in the permission data indicating that access is denied or granted to the user based on the user identifier and the application identifier; and
      if the status indicates access is granted, the current permission status is a confirmation that access is permitted for the user.

18. The device of claim 15, wherein the current permission status for the user comprises the most recently available permission information for the user.

19. The device of claim 15, wherein the processor is further configured to provide access to the first third-party application via a browser extension executed on a device of the user.

20. The device of claim 15, wherein the processor is further configured to:
   receive the permission data from the permission server; and
   update the security policy data, based on the received permission data, such that the updated security policy data comprises a list of third-party applications to which the user is currently permitted access and corresponding sign-on credentials for the third-party applications.

* * * * *